(12) United States Patent
Marioni

(10) Patent No.: US 6,847,183 B2
(45) Date of Patent: Jan. 25, 2005

(54) ELECTRONIC POWER SUPPLY FOR A SYNCHRONOUS MOTOR WITH PERMANENT-MAGNET ROTOR HAVING TWO PAIRS OF POLES

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 0 days.

(21) Appl. No.: 10/264,443

(22) Filed: Oct. 4, 2002

(65) Prior Publication Data

US 2003/0128008 A1 Jul. 10, 2003

Related U.S. Application Data

(63) Continuation of application No. 09/630,732, filed on Aug. 2, 2000, now abandoned.

(30) Foreign Application Priority Data

Aug. 6, 1999 (IT) .......................................... PD99A0190

(51) Int. Cl.[7] .............................. H02P 1/46; G05F 1/00
(52) U.S. Cl. ........................ 318/700; 318/786; 318/138; 318/439; 323/210; 323/211; 323/241
(58) Field of Search ................................. 318/700, 799, 318/138, 245, 254, 439, 785, 786, 791, 775, 787, 781, 774, 782, 749; 323/210, 212, 211, 232, 241

(56) References Cited

U.S. PATENT DOCUMENTS

| 3,761,792 A | * | 9/1973 | Whitney et al. ............. 318/788 |
| 3,970,908 A | * | 7/1976 | Hansen et al. .............. 318/786 |
| 4,296,362 A | * | 10/1981 | Beasley ....................... 318/136 |
| 4,488,101 A | * | 12/1984 | Studtmann ................... 318/800 |
| 4,804,901 A | * | 2/1989 | Pertessis et al. ............. 318/786 |
| 4,820,964 A | * | 4/1989 | Kadah et al. ................ 318/786 |
| 4,823,067 A | * | 4/1989 | Weber ......................... 318/799 |
| 4,862,053 A | * | 8/1989 | Jordan et al. ............... 318/786 |
| 5,013,990 A | * | 5/1991 | Weber ......................... 318/814 |
| 5,051,681 A | * | 9/1991 | Schwarz ...................... 318/786 |
| 5,077,512 A | * | 12/1991 | Weber ......................... 318/776 |
| 5,276,392 A | * | 1/1994 | Beckerman .................. 318/751 |
| 5,325,034 A | * | 6/1994 | Reynolds et al. ........... 318/782 |
| 5,434,491 A | | 7/1995 | Marioni |
| 5,483,139 A | * | 1/1996 | Welles, II .................... 318/782 |
| 5,497,064 A | * | 3/1996 | Van Sistine ................. 318/701 |
| 5,559,418 A | * | 9/1996 | Burkhart ...................... 318/785 |
| 5,821,722 A | * | 10/1998 | Forbes et al. ............... 318/696 |
| 5,859,513 A | * | 1/1999 | Stephens et al. ............ 318/430 |
| 6,121,749 A | * | 9/2000 | Wills et al. .................. 318/811 |
| 6,208,113 B1 | * | 3/2001 | Lelkes et al. ................ 318/807 |

* cited by examiner

Primary Examiner—David Martin
Assistant Examiner—Eduardo Colon Santana
(74) Attorney, Agent, or Firm—Akerman Senterfitt

(57) ABSTRACT

A low noise synchronous motor including a permanent-magnet rotor and a stator with at least two pairs of stator poles and corresponding winding further includes an electronic power supply comprising a capacitor that is serially connected to one winding of only one pair of poles to act as a 90° phase shifter. A static switch that is driven by an output of the electronic power device is connected to drive another winding of said two pairs. The static switch is controlled by a sensor detecting the position at the rotor.

27 Claims, 4 Drawing Sheets

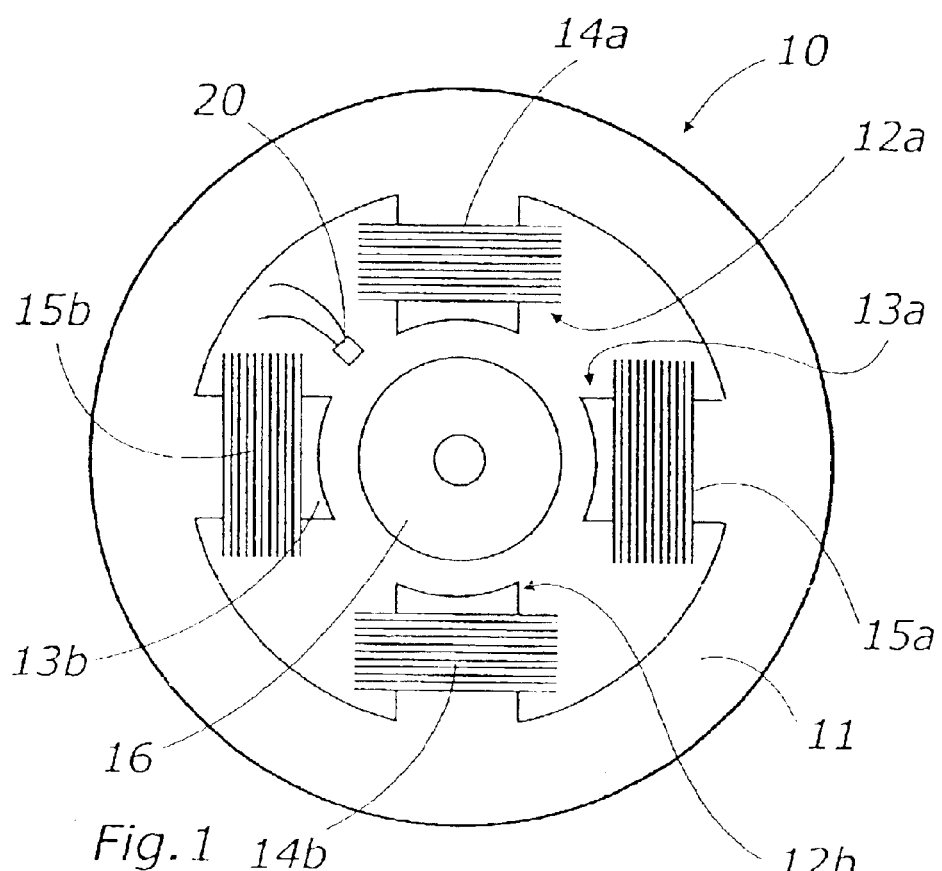
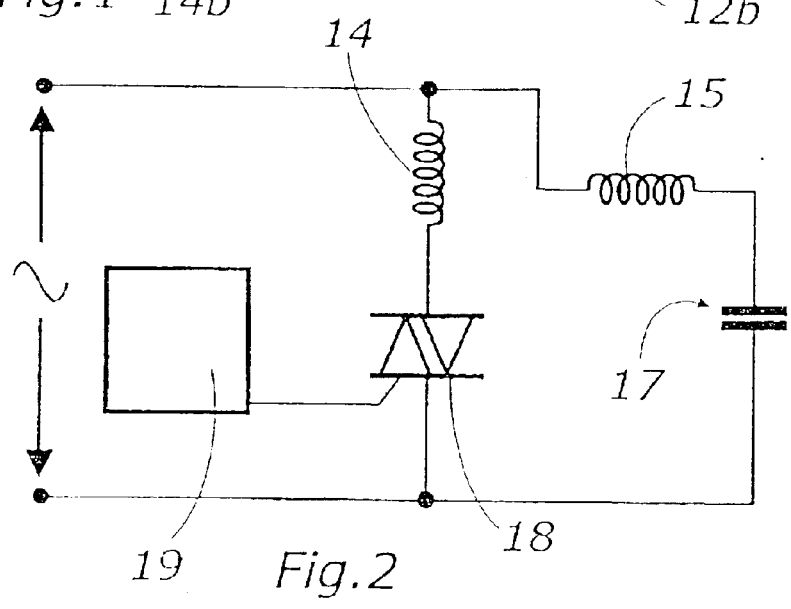

ELECTRONIC POWER SUPPLY FOR A SYNCHRONOUS MOTOR WITH PERMANENT-MAGNET ROTOR HAVING TWO PAIRS OF POLES

This is a Continuation of application Ser. No. 09/630,732 filed Aug. 2, 2000 now abandoned.

BACKGROUND OF THE INVENTION

The present invention relates to an electronic power supply for a synchronous motor with permanent-magnet rotor with two pairs of poles, supplied directly from the mains.

A synchronous motor with permanent-magnet rotor has many applications, especially in the civil sector, where the power levels involved are low or, as an approximate indication, lower than 100 W.

In their most basic structure, these motors have a fixed stator part and a part which rotates about its own axis of symmetry and is termed rotor. In these motors, the stator is constituted by an iron core which is shaped like a tuning fork and on which spools are fitted which support the windings, powered by the mains with an electronic device interposed.

The rotor is constituted, in its simplest form, by a cylinder of magnetic material which is rigidly coupled to the rotation shaft. The stator windings, supplied by the mains, produce a magnetic field which interacts with the magnetic poles of the rotor, causing the rotation of the rotor and therefore of the device connected thereto, which can be for example the impeller of a pump.

The advantages of the synchronous motor with permanent-magnet rotor with respect to an induction motor are both technical and economical. Technically, this type of motor is more compact, for an equal power level, and is always far more efficient than an asynchronous motor.

For instance, the U.S. Pat. No. 5,276,392 to Beckerman or the U.S. Pat. No. 5,325,034 to Reynolds both relate to a single phase AC motor including at least a winding connected in series with a phase shift capacitor and a second winding connected to a switch.

This kind of induction motor is asynchronous and there is no need to know the rotor position. Moreover, the rotor doesn't have permanent magnets and doesn't require a specific electronic control for driving the starting phase. However, the motor structure is complex, expensive and not suitable for low power applications.

Another reason to prefer synchronous motors is their low cost and the simple structure of the rotor and of the stator. This type of motor is single-phase, since the only winding is supplied with power by the mains voltage.

The U.S. Pat. No. 5,434,491 to this applicant relates to a synchronous motor with a permanent magnet rotor and including an electronic device for driving the starting phase of the motor.

However, this motor has application limits, particularly when low noise in operation is required. Because of its operating characteristic, the generated torque is in fact not constant at each instant during rotation.

In particular, the torque oscillates about a medium value and the oscillation frequency depends on the frequency of the supply voltage.

The torque that oscillates about the medium value can be considered as the sum of a constant term, which is responsible for moving the load, and of a pulsed term, which produces vibrations in the motor.

Additionally, the asymmetry of the stator pack means that there is a preferential direction for the attraction force which is in any case applied between the stator, constituted by iron laminations, and the rotor, which is made of magnetic material. This axial interaction and the pulsed nature of the torque, lead to pulsed stresses and therefore to vibrations which are generated in the stator of the motor.

The stator is always rigidly coupled to a supporting structure and therefore the structure is affected by these vibrations unless damping is provided, assuming of course this is possible; such damping is in any case expensive. In some applications, for example in a circulation pump for heating systems, these vibrations are in the audible frequency range and therefore produce an undesirable and unacceptable noise. These vibrations can be reduced, at least theoretically, by means of different electronic or mechanical refinements, but such refinements are expensive and scarcely reliable and in any case are only palliatives, since they tend to reduce the effect, but do not contrast the cause, of the noise.

SUMMARY OF THE INVENTION

The aim of the present invention is to provide a power supply for a synchronous motor with a permanent-magnet rotor which allows to eliminate the vibrations and the hence noise of the motor.

An object of the present invention is to provide an electronic starting device which allows complete structural symmetry, which is a further assurance of elimination of vibrations and of noise.

Another object of the present invention is to provide an electronic power supply for a synchronous motor with permanent-magnet rotor which is simple and safe.

Another object of the present invention is to provide an electronic power supply for a synchronous motor with permanent-magnet rotor and a synchronous motor with permanent-magnet rotor and two pairs of stator poles which is very efficient, inexpensive and safe.

These and other objects which will become better apparent hereinafter are achieved by an electronic power supply for a synchronous motor including a permanent-magnet rotor and two pairs of stator poles, according to the present invention, this motor comprises:
- a winding for each stator pole;
- an electronic power device for driving the windings of each pair of poles, said electronic power device receiving directly as power input a main voltage supply;
- a capacitor serially connected to one winding of each pair to act as a 90° phase shifter;
- a static switch driven by said electronic power device and connected to drive the other winding of said each pair;
- at least a position sensor connected to an input of said electronic power device for detecting the position and polarity of the rotor.

In order to optimize the performance of the motor, particularly during starting, it can be convenient to provide at least one of the electronic circuits with a booster coil which is engaged during starting and disconnected when steady-state operation is achieved.

BRIEF DESCRIPTION OF THE DRAWINGS

Further characteristics and advantages of the present invention will become better apparent from the following detailed description of a preferred embodiment thereof, given by way of non-limiting example and shown in the accompanying drawings, wherein:

FIG. 1 is a sectional view of the diagram of a motor according to the present invention;

FIG. 2 is a basic diagram of the electronic power supply circuit according to the present invention;

DESCRIPTION OF THE PREFERRED EMBODIMENTS

Figure 3:
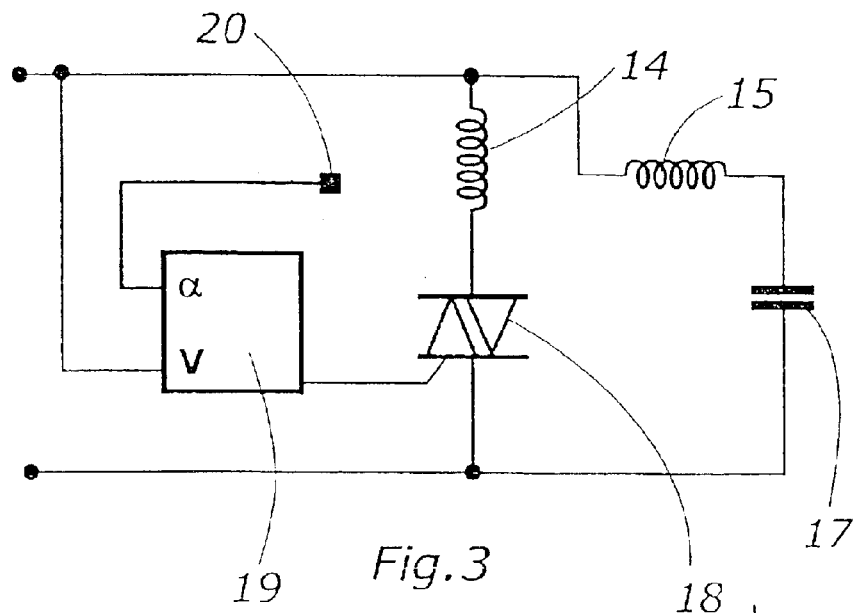
FIG. 3 is a basic diagram of the power supply circuit with the rotor position sensor.

With reference to the above-cited figures, the motor for which the electronic power supply device is designed is a synchronous motor with at least two pairs of poles with a permanent-magnet rotor, designated by the reference numeral 10 in FIG. 1. The motor is composed of a stator 11 which has four pole shoes, designated by the reference numerals 12a and 12b for the first pair and 13a and 13b for the second pair.

Two pairs of windings, respectively designated by the reference numerals 14a and 14b and 15a and 15b, are further present on each one of the two pairs. In the following pages of the description or in the electrical diagrams, the pair 14a and 14b is illustrated as a single coil 14 and the pair 15a and 15b is illustrated as a single coil 15.

A rotor 16 of the permanent-magnet type is arranged, and can rotate, between the pole shoes 12a, 13a, 12b and 13b. The motor according to the present invention is supplied with power directly by the mains by means of an electronic circuit.

Such circuit is shown schematically in FIG. 2 and substantially comprises the two coils 14 and 15, also shown graphically as being offset by 90 geometric degrees; the coil designated by the reference numeral 14 is supplied by means of a TRIAC 18 which is driven by an electronic device 19, while the coil designated by the reference numeral 15 is supplied with power by means of a capacitor 17 which phase-shifts through 90° the 5 current that circulates in the coil 15 with respect to the current that circulates in the coil 14.

As shown more clearly in FIG. 3, the electronic circuit 19 has a first power input receiving a signal which arrives from the mains voltage and a second signal input receiving a signal which arrives from a position sensor 20 which detects the position and polarity of the rotor.

Driving occurs when the polarity of the mains can produce a torque which is favorable for starting, according to the polarity of the rotor that faces the pole shoe. This association is achieved by means of the XOR logic function shown in FIGS. 4 and 5. The current on the two coils mutually offset by 90° occurs by means of the capacitor 17.

Figure 4:
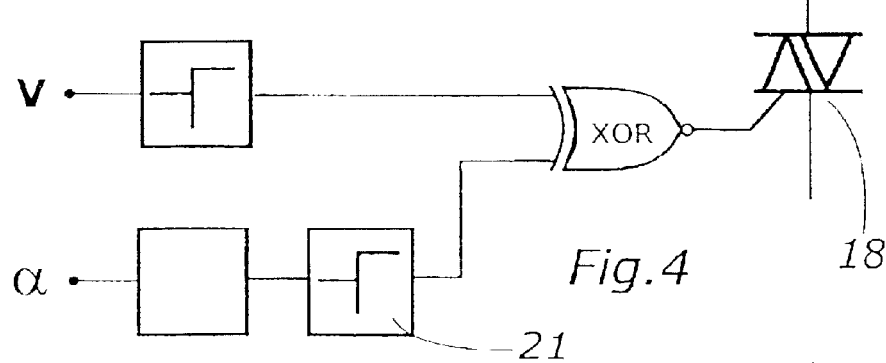
FIG. 4 is a diagram of a phase shifter for the signal that arrives from the rotor position sensor.

In order to improve the performance of the motor, depending on the position of the rotor position sensor or of the current-voltage phase shift, it can be necessary to apply, by means of the device 21 of FIG. 4, a phase shift to the signal that arrives from the position sensor. In order to further improve the efficiency of the electronic systems, the information related to the current zero-crossing of the motor is acquired so as to drive the TRIAC 18 only when necessary.

Figure 5:
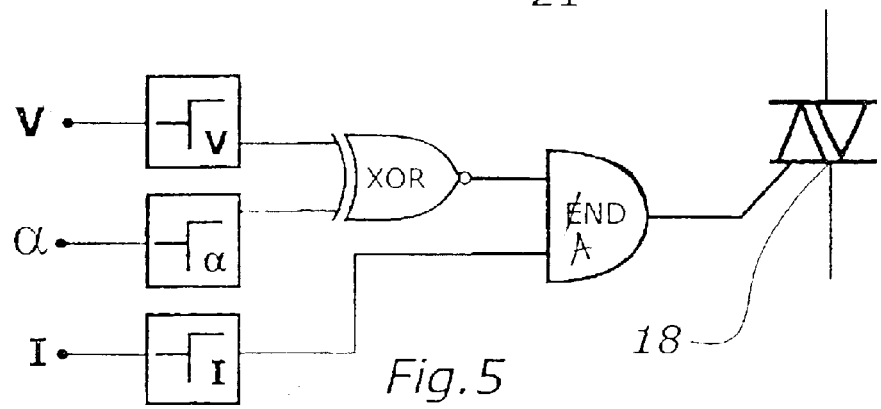
FIGS. 5 and 6 are views of logic devices for driving the static switch.
Figure 6:
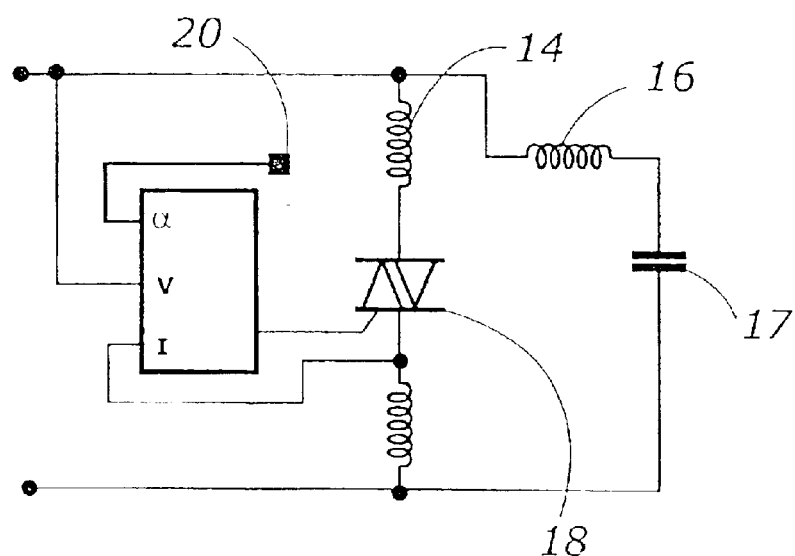

The current zero-crossing information can be acquired either by direct measurement of the current through the current sensor 28 or by other methods, for instance measuring the voltage drop across the TRIAC, as shown in FIGS. 5 and 6.

The current zero-crossing information is passed through an AND logic function together with the output of the XOR function, and the output of the AND function is used to drive the TRIAC 18, as shown in FIG. 5 and in FIG. 6.

Figure 7:
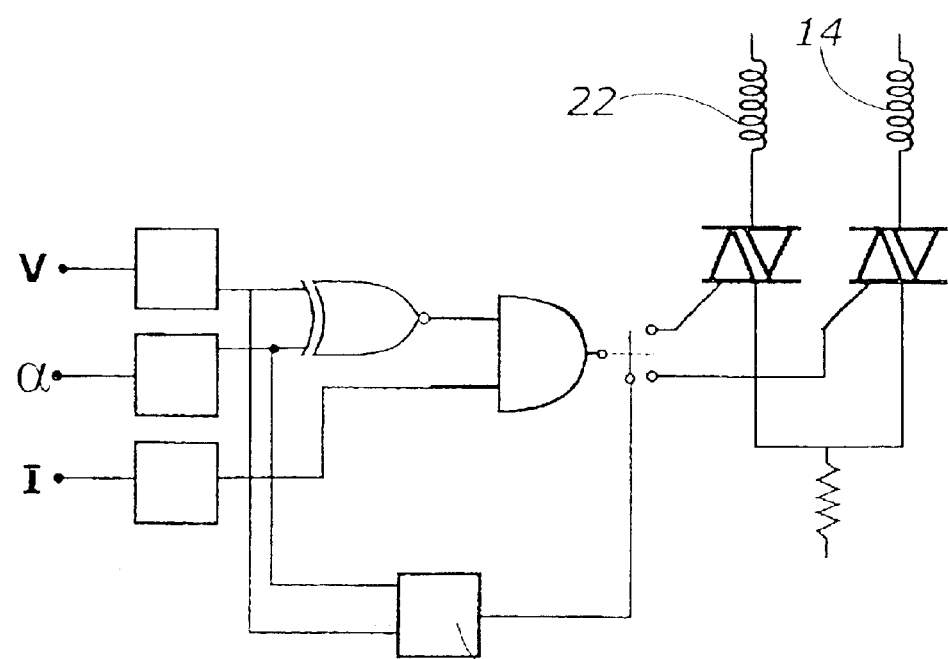
FIG. 7 is a diagram for driving an auxiliary starting coil.

In order to further improve the efficiency of the motor, it is possible to use an additional coil, designated by the reference numeral 22 in FIG. 7, which constitutes a booster coil which is designed to boost the stator field only during starting.

After starting, operation occurs only by means of the steady-state coil, while transition from the booster coil 22 to the steady-state coil 14 can occur by means of a timer or by means of a block, designated by the reference numeral 23 in FIG. 7, which is capable of detecting when the rotor 16 reaches the synchronous speed.

Figure 8:
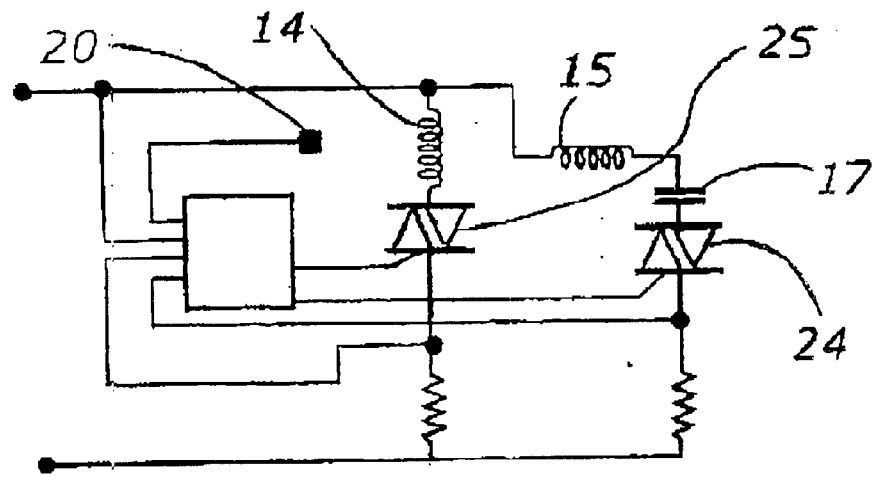
FIG. 8 is a diagram of the control of both coils of static switches.
Figure 9:
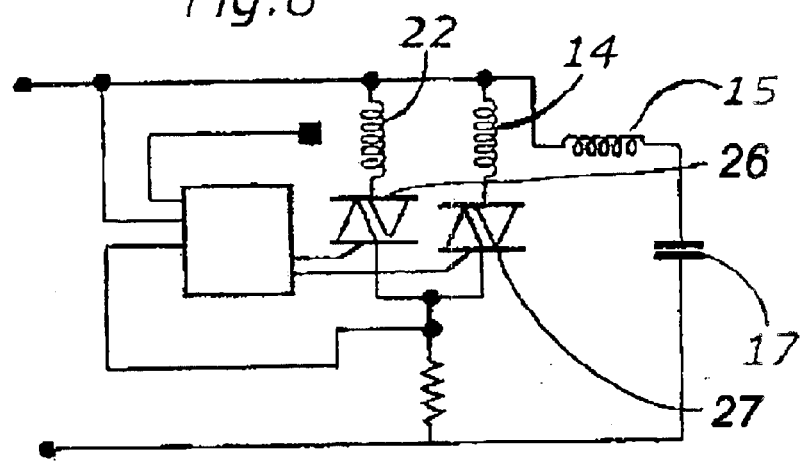
FIGS. 9 and 10 are views of the control of one of the two coils and of the starting coil by means of static switches.
Figure 10:
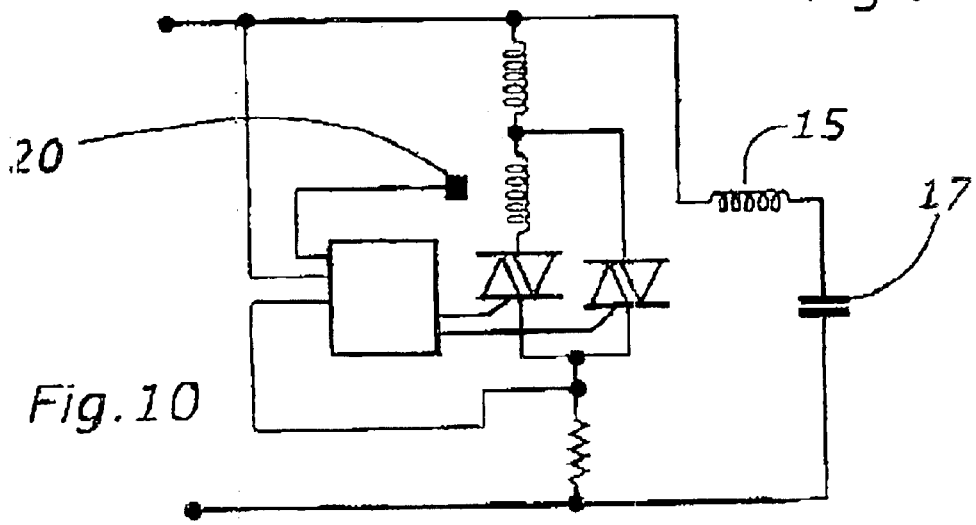

Moreover the device can be implemented with several configurations on the power section, shown by way of example in FIGS. 8, 9 and 10. In particular, in FIG. 8 both coils 14 and 15 are controlled by means of TRIACs, designated by the reference numerals 24 and 25 respectively. In FIG. 9, control occurs by means of TRIACs 26 and 27 both on the booster coil and on the steady-state coil, as shown in FIG. 9, while FIG. 10 is a view of a similar embodiment in which the booster coil is a fraction of the steady-state coil and both are TRIAC-controlled. With a configuration of this type, the resulting field is a rotating field which is equivalent to a pair of poles which also rotate about the same rotation axis as the rotor.

The interaction of the rotating pair of stator poles with the pair of poles of the rotor produces a torque at the axis which is constant in each instant and therefore free from vibrations.

The resulting motor has all the advantages of the high-efficiency synchronous motor with permanent-magnet rotor, while vibration is fully eliminated since the torque is no longer pulsed but is now constant.

Another advantage is that this synchronous motor with permanent-magnet rotor with two pairs of stator poles has a constant torque which tends to make it turn in a single direction.

During the transient starting step, the motor tends to accelerate monotonically in a direction which is determined by the phase of the power supply voltages. The control system obtains the intended phase shift between the power supply currents of the various phases by using an appropriate capacitor, and also allows direct power supply from the mains without AC/DC conversion.

The consequences of this technique are low cost, due to the reduction in power components, simplification of the control circuit, and great reduction in filtering requirements to avoid the harmonics that would be introduced as noise in the network.

The system is based on the recognition of the position and polarity of the rotor and of the polarity of the power supply voltage. The power supply of the coils is enabled only when the transient torque generated at that instant is suitable to start the motor.

In this way it is possible to achieve good pick-up and high steady-state efficiency.

Starting from the same inventive concept, it is possible to produce motors with multi-pole rotors and stators in which the number of stator pairs is twice the number of rotor pole pairs.

The dimensions, the materials and the components may of course be any according to requirements.

The disclosures in Italian Patent Application No. PD99A000190 from which this application claims priority are incorporated herein by reference.

What is claimed is:

1. An electronic power supply device for a low noise synchronous motor including a permanent-magnet rotor and a stator with at least two pairs of stator poles and corresponding windings, comprising:
  a power input receiving directly a main voltage supply;
  a signal input connected to a position sensor for detecting the position and polarity of the rotor;
  a capacitor serially connected to one winding of only one pair to act as a 90° phase shifter;
  a static switch driven by an output of said electronic power device and connected to drive another winding of said two pairs; and
  a further signal input for receiving a measure of the current flowing through said static switch to allow driving said static switch only when necessary,
  wherein said static switch is driven according to a function of the angular position of the rotor, according to the values of the main power supply voltages and to a value of said current flowing in said static switch.

2. The device according to claim 1, further comprising a delay circuit for correcting data acquired by said position sensor.

3. The device according to claim 1, further including an auxiliary booster coil that is engaged in an initial starting step by means of a controlled static switch in order to increase static torque and disengaged upon synchronization.

4. The device according to claim 3, wherein the booster coil is disengaged by means of a timer.

5. The device according to claim 3, wherein said booster coil is disengaged when a synchronization speed is reached.

6. The device according to claim 1, comprising a structure with a multi-pole rotor with a stator in which the number of stator pairs is twice the number of rotor pole pairs.

7. The device according to claim 1, wherein the measure of said current is obtained by a previous measure of the voltage drop on said static switch.

8. An electronic power supply device for the windings of a low noise synchronous motor including permanent-magnet rotor and at least two pairs of stator poles with corresponding windings; comprising:
  a first input directly receiving a main voltage supply reference;
  a second input connected to a position sensor for detecting the position and polarity of said rotor;
  a capacitor serially connected to one winding of only one pair to act as a 90° phase shifter; and
  a static switch driven by an output of said electronic power supply device and serially connected to a winding of another pair,
  wherein said static switch is driven when the polarity of the main power supply is favorable for starting, and
  wherein an XOR gate receives inputs the signals of said first and second inputs and an AND gate receives as inputs the output if the XOR gate and the signal received by a third input the output of the AND gate driving said static switch.

9. An electronic power supply device according to claim 8, a wherein feedback from said third input is connected to a zero-crossing detecting sensor associated to said static switch.

10. An electronic power supply device according to claim 9, wherein said zero-crossing detecting sensor measure a current flowing through said static switch.

11. An electronic power supply device according to claim 9, wherein said zero-crossing detecting sensor measure a voltage drop on said static switch.

12. An electronic power supply device according to claim 8, wherein a phase shift is applied to the signal received on said second input.

13. An electronic power supply device according to claim 8, wherein an additional booster coil is provided to boost a stator winding on starting.

14. An electronic power supply device according to claim 13, said booster coil is driven by a corresponding static switch connected to a further output of said power supply device.

15. An electronic power supply device according to claim 13, wherein said booster coil is a fraction of a steady state coil forming said other winding.

16. An electronic power supply device according to claim 13, wherein said booster coil is disengaged when a synchronization speed is reached.

17. An electronic power supply device according to claim 13, including a switch driven by a timer for disengaging said booster coil after a predetermined period of time.

18. A low noise synchronous motor including a permanent-magnet rotor and a stator with at least two pairs of stator poles, comprising:
  a winding for each stator pole;
  an electronic power device for driving the windings of each pair of poles, said electronic power device receiving directly as power input a main voltage supply;
  a capacitor serially connected to one winding of only one pair to act as a 90° phase shifter;
  a static switch driven by said electronic power device and connected to drive a winding of another pair; and
  at least one position sensor connected to an input of said electronic power device for detecting the position and polarity of the rotor,
  wherein an XOR gate receives as inputs the signals of first and second inputs of said electronic power device and an AND gate receives as inputs the output of the XOR gate and the signal received by a third input, the output of the AND gate driving said static switch.

19. A low noise synchronous motor according to claim 18, wherein said third input is connected to a zero-crossing detecting sensor associate to said static switch to drive said static switch only when necessary.

20. A low noise synchronous motor according to claim 19, wherein said zero-crossing detecting sensor measure a current flowing through said static switch.

21. A low noise synchronous motor according to claim 19, wherein said zero-crossing detecting sensor measure a voltage drop on said static switch.

22. A low noise synchronous motor according to claim 18, wherein a phase shift is applied to the signal received on said second input.

23. A low noise synchronous motor according to claim 18, wherein an additional booster coil is provided to boost a stator winding on starting.

24. A low noise synchronous motor according to claim 23, wherein said booster coil is driven by a corresponding static switch connected to a further output of said power supply device.

25. A low noise synchronous motor according to claim 23, wherein said booster coil is a fraction of a steady state coil forming said other winding.

26. A low noise synchronous motor according to claim 23, wherein said booster coil is disengaged when a synchronization speed is reached.

27. A low noise synchronous motor according to claim 23, including a switch driven by a timer for disengaging said booster coil after a predetermined period of time.

* * * * *

UNITED STATES PATENT AND TRADEMARK OFFICE
CERTIFICATE OF CORRECTION

PATENT NO. : 6,847,183 B2  Page 1 of 1
APPLICATION NO. : 10/264443
DATED : January 25, 2005
INVENTOR(S) : Marioni It is certified that error appears in the above-identified patent and that said Letters Patent is hereby corrected as shown below:

Column 2, line 22, replace "and the hence" with --and hence the--

Column 5, line 50, insert --as-- after "receives"

Column 5, line 52, replace "if" with --of--

Column 5, line 53, insert --,-- after "input"

Column 5, line 56, replace "8, a wherein" with --8, wherein--

Column 5, line 60, replace "measure" with --measures--

Column 5, line 63, replace "measure" with --measures--

Column 6, line 5, insert --wherein-- after "13,"

Signed and Sealed this

Twelfth Day of December, 2006

JON W. DUDAS
*Director of the United States Patent and Trademark Office*